(12) United States Patent
Zhong

(10) Patent No.: US 9,703,285 B2
(45) Date of Patent: Jul. 11, 2017

(54) FAIR SHARE SCHEDULING FOR MIXED CLUSTERS WITH MULTIPLE RESOURCES

(75) Inventor: Enci Zhong, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 2420 days.

(21) Appl. No.: 11/552,554

(22) Filed: Oct. 25, 2006

(65) Prior Publication Data

US 2008/0103861 A1    May 1, 2008

(51) Int. Cl.
| | |
|---|---|
| *G06Q 10/00* | (2012.01) |
| *G05B 19/418* | (2006.01) |
| *G06Q 10/06* | (2012.01) |
| *G06Q 50/18* | (2012.01) |

(52) U.S. Cl.
CPC ..... *G05B 19/41865* (2013.01); *G06Q 10/063* (2013.01); *G06Q 10/0631* (2013.01); *G06Q 10/06312* (2013.01); *G06Q 50/188* (2013.01); *G05B 2219/32258* (2013.01); *G05B 2219/32418* (2013.01); *Y02P 90/20* (2015.11)

(58) Field of Classification Search
CPC .... G05B 19/41865; G05B 2219/32258; G05B 2219/32418; G06Q 10/063; G06Q 10/0631; G06Q 10/06312; G06Q 50/188; Y02P 90/20
USPC .............................. 705/7.11, 7.12, 7.13, 7.22
See application file for complete search history.

(56) References Cited

U.S. PATENT DOCUMENTS

| | | | |
|---|---|---|---|
| 5,963,963 A | 10/1999 | Schmuck et al. | 707/205 |
| 6,195,676 B1 | 2/2001 | Spix et al. | 709/107 |
| 6,263,359 B1* | 7/2001 | Fong et al. | 718/103 |
| 6,314,460 B1 | 11/2001 | Knight et al. | |
| 6,401,223 B1* | 6/2002 | DePenning | 714/42 |
| 6,499,063 B1 | 12/2002 | Chessell et al. | |
| 6,571,288 B1 | 5/2003 | Sarukkai | |
| 6,594,786 B1 | 7/2003 | Connelly et al. | |
| 6,618,742 B1 | 9/2003 | Krum | |
| 6,625,709 B2 | 9/2003 | Aiken et al. | 711/170 |
| 6,785,889 B1* | 8/2004 | Williams | G06F 9/50 709/229 |

(Continued)

FOREIGN PATENT DOCUMENTS

| | | |
|---|---|---|
| JP | 11212809 A | 8/1999 |
| JP | 2004192400 A | 7/2004 |

OTHER PUBLICATIONS

LRCM (DCPS) Reference Manual.*

(Continued)

*Primary Examiner* — Jamie Austin
(74) *Attorney, Agent, or Firm* — Heslin Rothenberg Farley & Mesiti P.C.

(57) ABSTRACT

A technique for determining scheduling priorities of jobs of different types to facilitate workload management in a clustered processing environment having a plurality of managed resource types is provided. The technique includes allocating shares of multiple managed resource types to users and user groups of the clustered processing environment. The technique also includes assigning a job priority for a subsequent job submitted by a user or group, wherein the calculated job priority is based on a type attribute of the subsequent job and the number of the user's or group's remaining shares of at least one managed resource type of the multiple of managed resource types.

25 Claims, 12 Drawing Sheets

(56) References Cited

U.S. PATENT DOCUMENTS

| | | | |
|---|---|---|---|
| 6,909,691 B1* | 6/2005 | Goyal | G06F 13/36 370/230 |
| 6,959,320 B2 | 10/2005 | Shah et al. | |
| 7,139,784 B2 | 11/2006 | Knobe et al. | |
| 7,171,668 B2 | 1/2007 | Molloy et al. | |
| 7,206,849 B1 | 4/2007 | Gernert et al. | |
| 7,241,044 B1 | 7/2007 | Kitamura et al. | |
| 7,698,251 B2 | 4/2010 | Brelsford et al. | |
| 2002/0052947 A1 | 5/2002 | Duimovich et al. | |
| 2003/0115244 A1 | 6/2003 | Molloy et al. | |
| 2004/0160961 A1* | 8/2004 | Duckering et al. | 370/395.4 |
| 2004/0226015 A1 | 11/2004 | Leonard et al. | |
| 2004/0230675 A1* | 11/2004 | Freimuth et al. | 709/223 |
| 2004/0249904 A1* | 12/2004 | Moore | H04L 29/06 709/216 |
| 2004/0253940 A1 | 12/2004 | Andrews et al. | 455/405 |
| 2005/0021306 A1 | 1/2005 | Garcea et al. | |
| 2005/0055694 A1 | 3/2005 | Lee | 719/100 |
| 2006/0075079 A1* | 4/2006 | Powers | G06F 9/5072 709/220 |
| 2006/0288346 A1* | 12/2006 | Santos et al. | 718/102 |
| 2007/0234365 A1* | 10/2007 | Savit | G06F 9/505 718/104 |
| 2007/0256077 A1 | 11/2007 | Zhong | |
| 2008/0103861 A1* | 5/2008 | Zhong | 705/8 |

OTHER PUBLICATIONS

Platform. Administring Platform LSF. Jan. 2004. p. 1-580.*
DPCS/LCRM Reference Manual, http://www.llnl.gov.LCdocs/dpcs/index.jsp?show-s5.1.
"Fair Share", Maui Scheduler Administrator's Manual, http://anusf.anu.edu.au/⊇dbs900/PBS/Maui/fairshare.html.
"LoadLeveler for AIX 5L and Linux—Using and Administering", Version 3, Release 3.1, SA22-7881-04, Nov. 2005, pp. 36-37, 201, 258-259 and 274-275.
Malluhi et al., "Coding for high availability of a distributed-parallel storage system," Dept. of Comput. Sci; Jacksonville State Univ.; AL; USA; IEEE Transactions on Parallel and Distributed Systems, vol. 9, No. 12, pp. 1237-1252, Dec. 1998 (Abstract Only).
Levy et al., "Distributed File Systems: Concepts and Examples," ACM Computing Surveys, vol. 22, No. 4, Dec. 1990, pp. 321-374.
Hu et al., "Run-Time Support for Distributed Sharing in Safe Languages," ACM Transactions on Computer Systems, vol. 21, No. 1, Feb. 2003, pp. 1-35.
Sen et al., "Analyzing Peer-To-Peer Traffic Across Large Networks," IEEE/ACM Transactions on Networking, vol. 12, No. 2, Apr. 2004, pp. 219-232.
Lucash et al., "Reconciliation of Independently Updated Distributed Data," U.S. Appl. No. 11/272,221, filed Nov. 10, 2005. (Abandoned).
Massie, Matthew et al., "The Ganglia Distributed Monitoring System: Design, Implementation, and Experience," El Servier Parallel Computing, Jun. 15, 2004, pp. 817-838.
Elmroth, E; Gardfjall, P.; "Design and Evaluation of a Decentralized System for Grid-Wide Fairshare Scheduling," Jul. 1, 2005, First International Conference on e-Science and Grid Computing, 2005.
Kay, J. and P. Lauder; "A Fair Share Scheduler," Jan. 1988, Communications of the ACM, vol. 31, No. 1, pp. 44-45.
Office Action for U.S. Appl. No. 11/412,758 dated May 26, 2010.
Office Action for U.S. Pat. No. 7,698,251 dated Apr. 27, 2006.
Final Office Action for U.S. Pat. No. 7,698,251 dated Oct. 23, 2008.
Office Action for U.S. Pat. No. 7,698,251 dated Apr. 10, 2009.
Final Office Action for U.S. Pat. No. 7,698,251 dated Oct. 26, 2009.
Final Office Action for U.S. Appl. No. 11/412,758 dated Oct. 1, 2010.

* cited by examiner

FAIR SHARE SCHEDULING FOR MIXED CLUSTERS WITH MULTIPLE RESOURCES

CROSS-REFERENCE TO RELATED APPLICATIONS

This application contains subject matter which is related to the subject matter of the following applications, which are assigned to the same assignee as this application. Each of the below listed applications is hereby incorporated herein by reference in its entirety:

"FAIR SHARE SCHEDULING BASED ON AN INDIVIDUAL USER'S RESOURCE USAGE AND THE TRACKING OF THAT USAGE", Zhong, U.S. Ser. No. 11/412,758, filed Apr. 27, 2006.

"FAULT TOLERANT FACILITY FOR THE AGGREGATION OF DATA FROM MULTIPLE PROCESSING UNITS", Brelsford et al., U.S. Ser. No. 11/412,757, filed Apr. 27, 2006.

TECHNICAL FIELD

This invention relates, in general, to fair share scheduling, and in particular, to determining job scheduling priorities for fair share scheduling that is based on an individual user's usage of multiple types of managed resources in a processing environment.

BACKGROUND OF THE INVENTION

Fair share scheduling is a functional feature in workload management products. In a distributed processing environment, such as a clustered environment, workload management software products are used to schedule user programs or jobs to run on various machines of the environment. Fair share scheduling drives the scheduling decisions in the direction of dividing the processing resources of the processing environment among users or groups of users according to predefined proportions.

In fair share scheduling, a user or group of users is allocated a certain proportion of the resources of the environment, and the scheduling priority of a job of that user or group of users is dependent on the amount of resources used by the user or group of users as compared against the resources used by all users or groups of users. Thus, the scheduling priority of a job of one user or group of users is dependent on the amount of resources consumed by other users. The proportion of resources is often expressed as a percentage of total resource usage.

This scheduling based on resource consumption by others may produce unstable and undesirable scheduling for the jobs of an individual user. Such scheduling may be unstable because it is dependent on the workload of others, which may change drastically at any point in time. Also, it is undesirable because the scheduling of a user's job is based on resource consumption by other users.

In fair share scheduling, the historic resource usage decays over time to allow the more recently used resources to have larger influence on the scheduling decisions. A mechanism to record and decay the historic resource usage is necessary, and it is often accomplished through a stepwise decay function over a number of recent intervals of finite length. A large amount of historic resource usage data may need to be tracked for a cluster with many users.

SUMMARY OF THE INVENTION

Based on the foregoing, a need exists for an enhanced fair share scheduling capability that is more stable and fair to the individual users or groups of users. Also, a need exists for an approach that simplifies the decay mechanism and minimizes the amount of historic resource usage data to track. Furthermore, there is a need for fair share scheduling of different job types that may use one or more types of the resources of a processing environment in different proportions.

The shortcomings of the prior art are overcome and additional advantages are provided through the provision of a method of determining scheduling priorities of jobs of different types to facilitate workload management in a clustered processing environment having a plurality of coupled processing units. The method includes, for instance, allocating one or more shares of each managed resource type of multiple managed resource types of a plurality of managed resource types of a clustered processing environment to at least one user entity of the clustered processing environment. The method also includes assigning a job priority for a subsequent job submitted by a user entity of the at least one user entity, wherein the job priority is based on a type attribute of the subsequent job and the number of the user entity's remaining shares of at least one managed resource type of the multiple of managed resource types.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
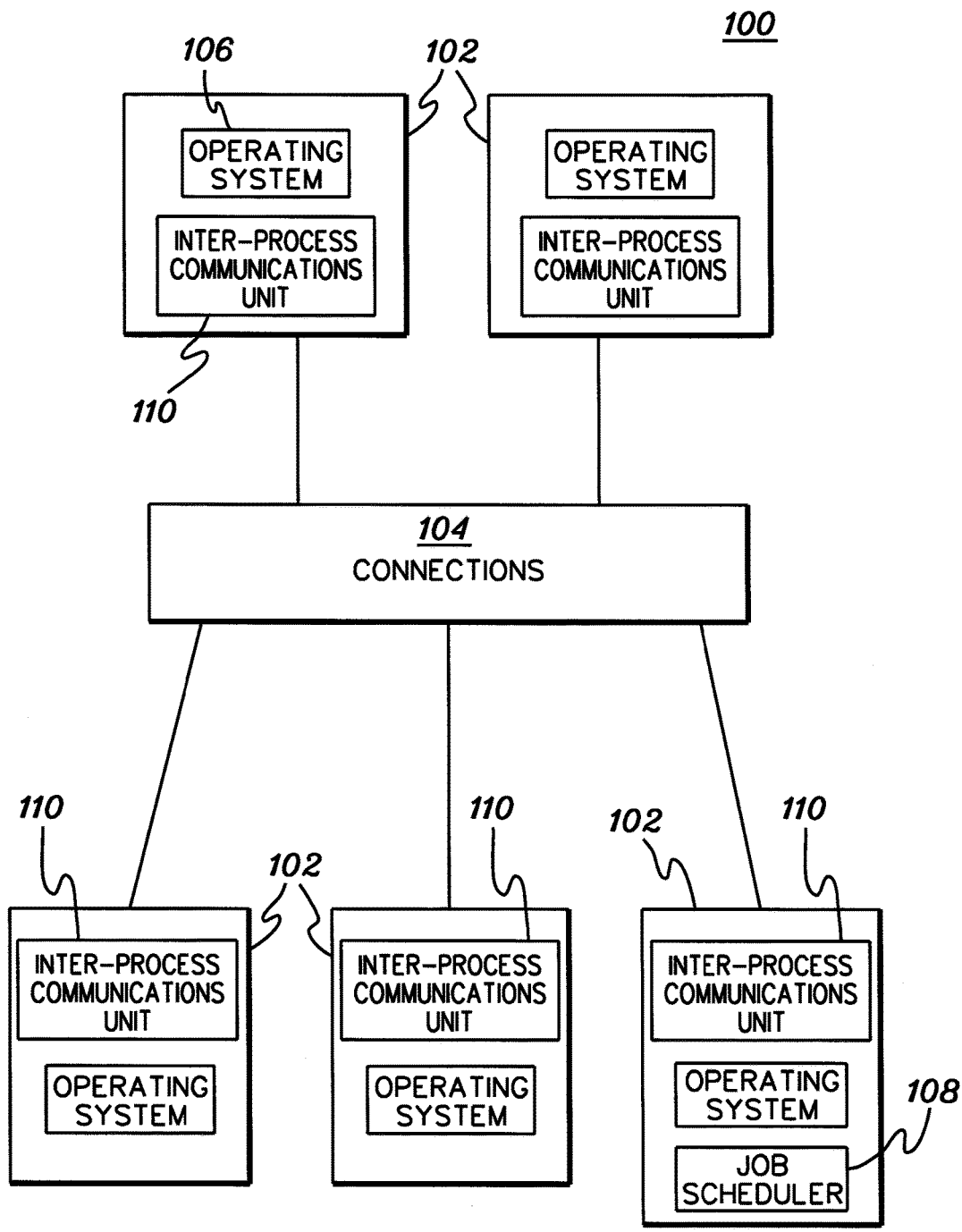
FIG. 1 depicts one embodiment of a processing environment incorporating and using one or more aspects of the present invention.

One aspect of the present invention provides fair share scheduling for workload management in mixed-cluster processing environments with multiple types of resources and multiple job types. For each type of resource to be managed, the amount of each type of resource available in a mixed cluster of machines is divided into a number of total shares. Each user or group using the cluster may be allocated some number of the total shares for each type of the managed resource. Each user's and group's usage for each type of the managed resources is tracked and converted to used shares. For each user and group, the numbers of used shares and allocated shares for each type of resource are used to influence job scheduling priorities in the direction of fair share scheduling. Because distinct job types may utilize the managed resource types of the clustered processing environment in different proportions, the job type of a queued job awaiting execution is used as a factor in the determination of a job scheduling priority for a queued job.

In accordance with an aspect of the present invention, a fair share scheduling capability is provided that enables the stable and fair scheduling of jobs of an individual user or group of users. The scheduling depends on the type of job, which may be indicative of the types of resources required for execution, in addition to resource allocation to and usage by that individual user or group of users, instead of allocation to and usage by other users or groups of users. Measures of the available resources of each type in a mixed processing environment are divided into a number of shares. These managed resources are the resources that are configured for the environment and available to be used, independent of resource consumption. A user or group of users is allocated a portion of the shares of each managed resource type. Then, each job of the user or group of users to be executed is assigned a job execution scheduling priority. This priority is based on how many shares of the user's or group's allocation for each type of managed resource currently remains. The priority determined is independent of the usage of managed resources by others in the mixed clustered processing environment.

Since the scheduling priority of a job submitted by a user is affected by the number of shares of managed resources used by the user or group of users to which the user belongs compared to the number of allocated shares, resource usage by the user or group of users is tracked and accumulated. Further, in accordance with an aspect of the present invention, an exponential decay mechanism is applied to the accumulated resource usage data to place more weight on recent usage and less weight on usage in the more distant past so that job scheduling priority is affected more by recent usage of managed resources than by past usage at an earlier time.

One embodiment of a processing environment incorporating and using one or more aspects of the present invention is described with reference to FIG. 1. In one example, the processing environment is a distributed processing environment, such as a clustered computing environment, in which resources of the environment are shared to perform system tasks. One exemplary clustered processing environment is a mixed clustered processing environment, wherein the cluster of processors includes processors having different resource types. Although a clustered environment is described herein as incorporating and using one or more aspects of the present invention, other types of environments, including non-clustered environments, may benefit from one or more aspects of the present invention.

FIG. 1 depicts a clustered environment 100 including, for instance, a plurality of processing units 102 coupled to one another via one or more connections 104. Connections 104 include, but are not limited to, wire connections, wireless connections or any type of network connection, such as a local area network (LAN), a wide area network (WAN), a token ring, an Ethernet connection, etc.

The processing units may include, for example, personal computers, laptops, workstations, servers, mainframes, mini computers or any other type of processing units. As one particular example, one or more of the processing units is a pSeries® server offered by International Business Machines Corporation, Armonk, N.Y., and one or more other processing units of the mixed clustered processing environment is a Blue Gene® system offered by International Business Machines Corporation, Armonk, N.Y. ("pSeries" and "Blue Gene" are registered trademarks of International Business Machines Corporation, Armonk, N.Y.) Each processing unit may or may not be the same type of processing unit as another unit. In one example, different processing units comprise different resource types. In one example, each processing unit executes an operating system 106, such as LINUX, or AIX® offered by International Business Machines Corporation. ("AIX" is a registered trademark of International Business Machines Corporation, Armonk, N.Y.) The operating system of one processing unit may be the same or different from another processing unit. Further, in other examples, one or more of the processing units may not include an operating system.

In accordance with an aspect of the present invention, one or more of the processing units, referred to herein as managers, execute a job scheduler 108. Job scheduler 108 is, for instance, a program that is responsible for scheduling jobs of user entities. As used herein, the term user entity refers to a user or group of users. The job scheduler schedules the jobs using a fair share scheduling technique. In addition, the processing units include an inter-processor communications unit 110 that facilitates communication between a manager and other processing units of the clustered processing environment, in which the other processing units include at least one managed resource type of the multiple managed resource types in the mixed clustered processing environment that are managed by the job scheduler. Examples of inter-processor communications units include Ethernet modems, token ring modems, other LAN modems, other WAN modems, and wireless network modems.

In a cluster with many computing machines used to run user programs or jobs, workload management software may include an embodiment of fair share scheduling in accordance with an aspect of the present invention to facilitate fair utilization of computing resources of the clustered processing environment that are to be distributed fairly among all the users and groups. At a high level, fair share scheduling collects resource usage information and uses this information to determine job scheduling priorities in such a way as to manage or regulate the use of resources by each user and group in order to provide the desired resource usage proportions for each user entity.

In a cluster of computing machines, there are many kinds of computing resources. Each machine may have processors, memory, network bandwidth, and storage devices, for example. A cluster may include different types of computing machines as well. Fair share scheduling may manage one class of resources like central processing units (CPUs), but it is not limited to the management of only one class of resources. For example, fair share scheduling may address a combination of resources such as the combination of CPU and memory with different weights attached to each, e.g., 2*CPU +1*Memory. The classes, types, or combinations of resources to be managed through fair share scheduling may be selected by a user of a clustered processing environment who has administrative authority.

An aspect of the present invention provides a fair share scheduling mechanism for multiple types of resources. This may be desirable if the types of resources are basically independent of each other because, for example, the resources are provided by very different types of machines. For instance, an IBM Blue Gene® system and a Linux or AIX® machine provide different types of resources, but a mixed clustered processing environment may comprise an IBM Blue Gene® system and a number of Linux or AIX® machines. A fair share scheduling mechanism for multiple types of resources, in accordance with an aspect of the present invention, may also be used to manage different resources, for example, the CPU and memory, in a homogenous cluster of the same machines. Some user programs may be CPU intensive, whereas other user programs may be memory intensive. In this instance, determining job priority according to separate CPU and memory usages may be advantageous. Again, the type of resources managed can be a simple type such as the CPU resources or a composite type like a combination of various resources.

Figure 2:
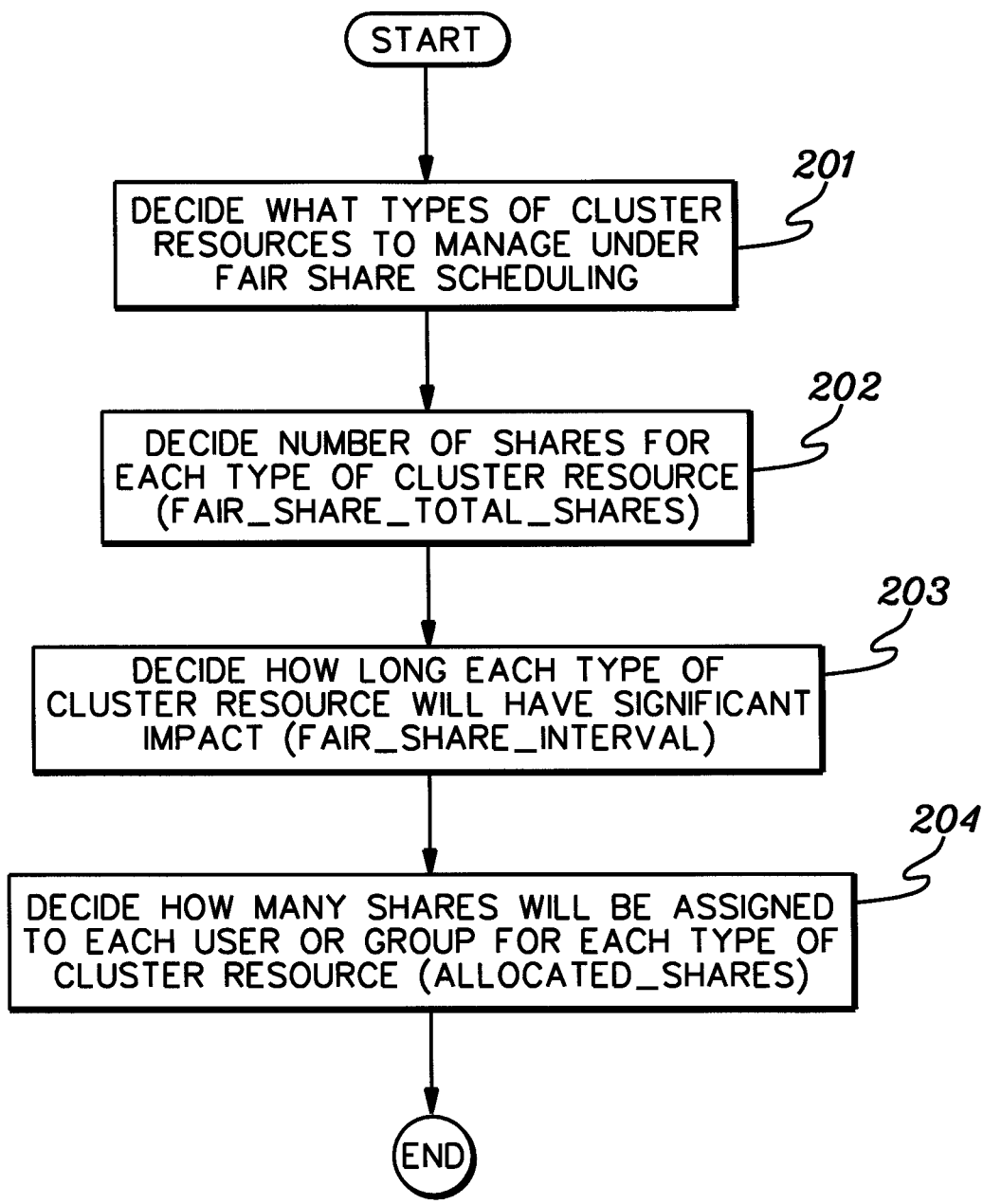
FIG. 2 depicts a flow diagram of an initialization process for fair share scheduling for a mixed cluster of machines, in accordance with an aspect of the present invention.

FIG. 2 illustrates a flow diagram of one embodiment of an initialization process for fair share scheduling for a mixed cluster of machines. The initialization process of FIG. 2 includes for instance, obtaining an indication of the types of cluster resources to mange under fair share scheduling (STEP 201). An authorized user of a mixed clustered processing environment such as an administrator may input the types of resources of the cluster to manage based on a desired objective of the fair share scheduling. The initialization procedure of FIG. 2 includes obtaining an indication of the total number of shares into which each type of managed resource will be divided in STEP 202. Factors that may affect the number of total shares for each type of managed resource include convenience for share allocation and the desired sensitivity to resource usage changes for each type of managed resource. In STEP 203 of the initialization of FIG. 2, an indication of the duration that each type of cluster resource will have a significant impact is obtained. For example, this indication of duration may include a time constant that characterizes a decay function applied to a measured use of a managed resource type. In another example, indication of duration may include a time interval. In one embodiment, each type of resource may have its own decay characteristics. The initialization process of FIG. 2 also includes obtaining data indicating the number of shares of each type of managed resource allocated to each user entity (STEP 204). The allocation of shares to each user or group for each type of resource is very flexible so that it is possible to provide a set of users with dominant use of certain types of resources if needed or desired.

Figure 3:
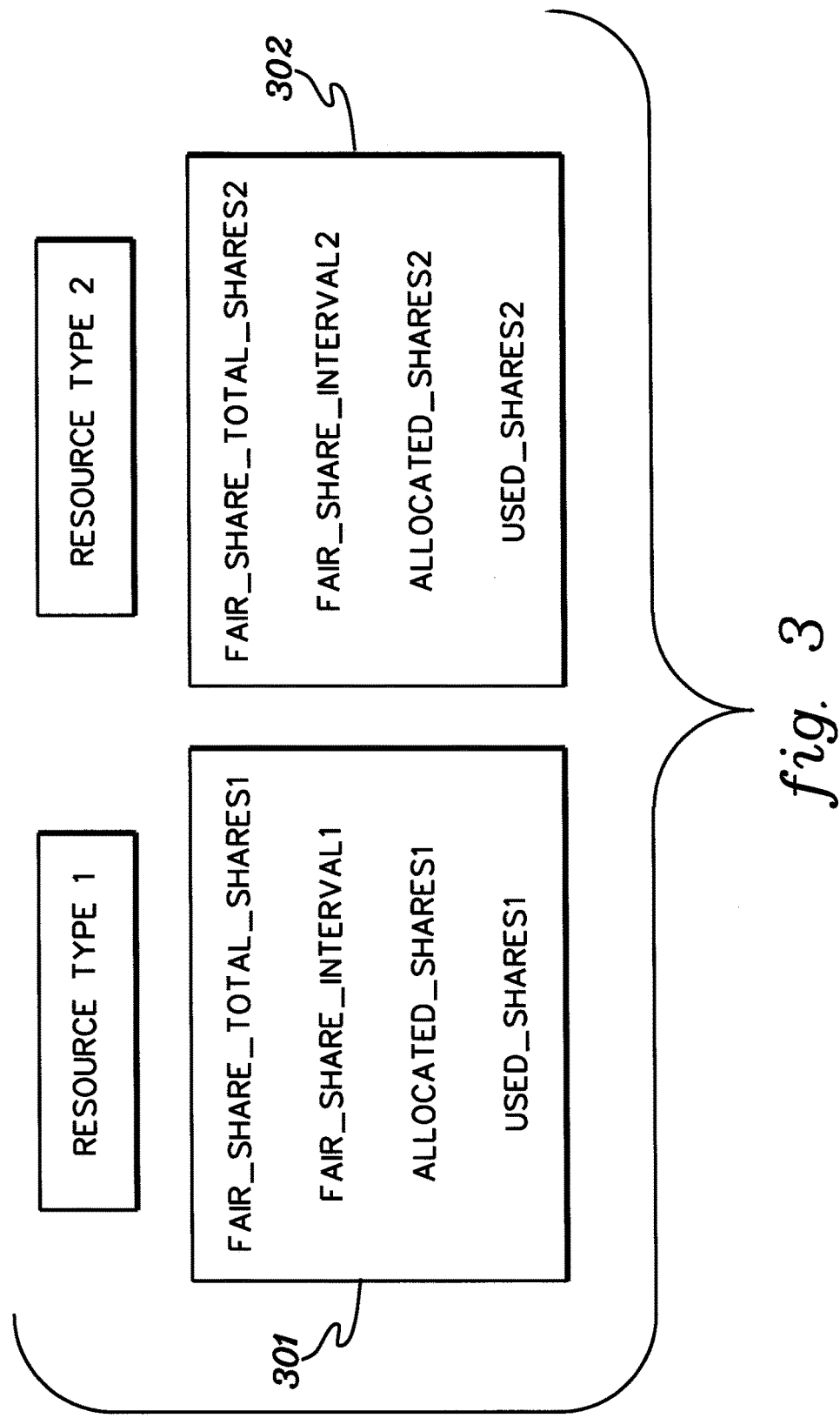
FIG. 3 depicts an example of data associated with managed resource types in one embodiment of determining scheduling priorities of jobs to facilitate workload management in a clustered processing environment, in accordance with an aspect of the present invention.

FIG. 3 illustrates an example of data associated with managed resources in one embodiment of determining scheduling priorities of jobs to facilitate workload management in a clustered processing environment, in accordance with an aspect of the present invention. In the example of FIG. 3, each of two types of managed resources has its own parameters and initialization data pertaining to determining scheduling priorities of jobs. In addition, data pertaining to the number of shares of a managed resource used by each user entity is associated with each resource type.

Data 301, which is associated with Resource Type 1, includes, for instance, user-entity resource-type-usage data, USED_SHARES1, and parameters FAIR_SHARE_TOTAL_SHARES1, FAIR_SHARE_INTERVAL1, and ALLOCATED_SHARES1. FAIR_SHARE_TOTAL_SHARES1 indicates the total number of shares into which Resource Type 1 will be divided; FAIR_SHARE_INTERVAL1 indicates a time constant that characterizes a decay function that will be applied to usage data for Resource Type 1; and ALLOCATED_SHARES1 represents data pertaining to the number of shares of Resource Type 1 allocated to each user entity. Similarly, data 302, which is associated with Resource Type 2, includes, for instance, user-entity resource-type-usage data, USED_SHARES2, and parameters FAIR_SHARE_TOTAL_SHARES2, which indicates the total number of shares into which Resource Type 2 will be divided, FAIR_SHARE_INTERVAL2, which indicates a time constant that characterizes a decay function that will be applied to usage data for Resource Type 2, and ALLOCATED_SHARES2, which represents data pertaining to the number of shares of Resource Type 2 allocated to each user entity.

Figure 4:
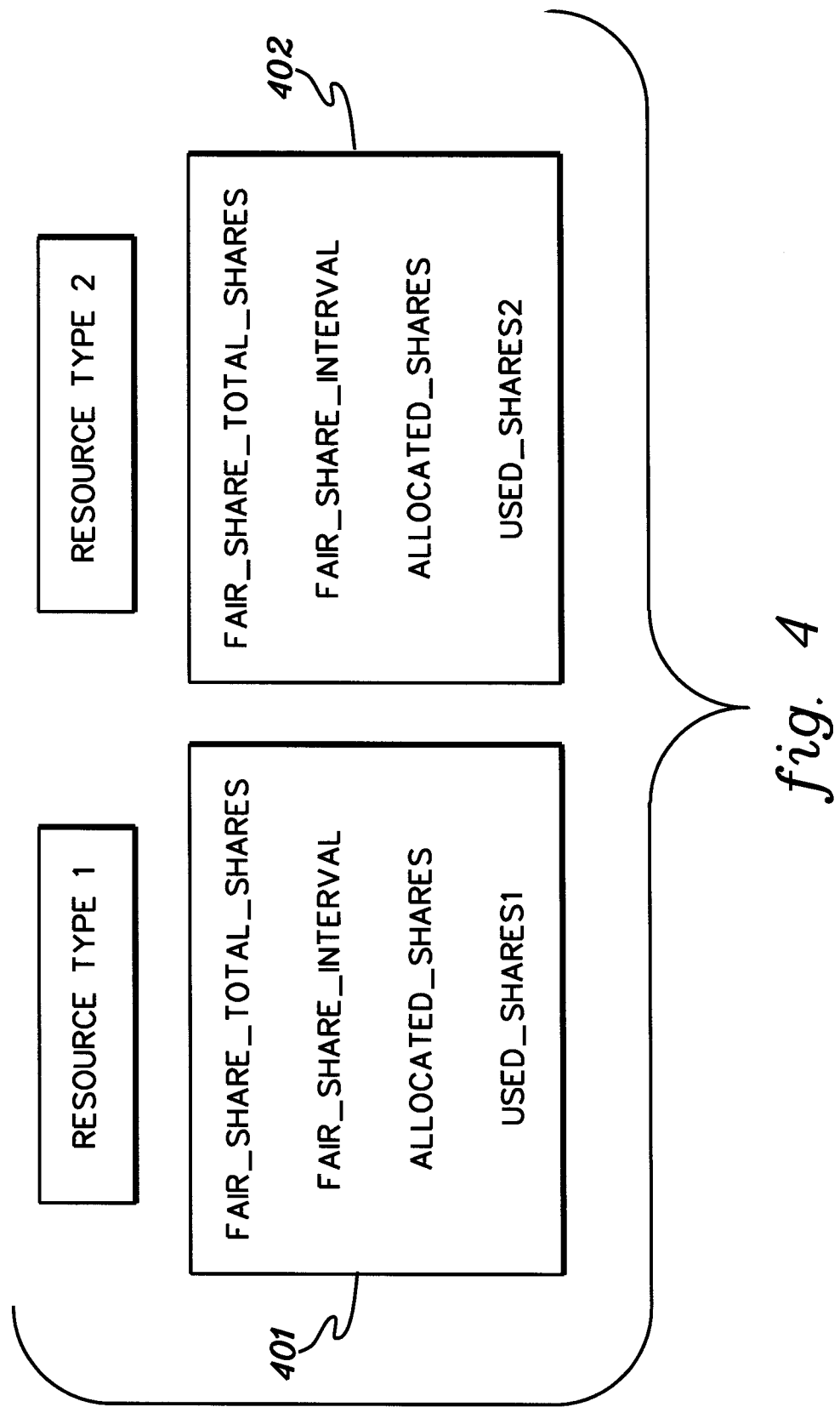
FIG. 4 depicts another example of data associated with managed resource types in an embodiment of determining scheduling priorities of jobs to facilitate workload management in a clustered processing environment, in accordance with an aspect of the present invention.

FIG. 4 illustrates another example of data associated with managed resources in an embodiment of determining scheduling priorities of jobs to facilitate workload management in a clustered processing environment, in which a number of common parameters are associated with the managed resource types. Data 401, including FAIR_SHARE_TOTAL_SHARES, FAIR_SHARE_INTERVAL, ALLOCATED_SHARES, and USED_SHARES1 is associated with Resource Type 1, and data 402 including FAIR_SHARE_TOTAL_SHARES, FAIR_SHARE_INTERVAL, ALLOCATED_SHARES, and USED_SHARES2 is associated with Resource Type 2, as examples. In this example, both Resource Type 1 and Resource Type 2 are divided into a number of shares indicated by the parameter FAIR_SHARE_TOTAL_SHARES. Also, the same time constant, FAIR_SHARE_INTERVAL, characterizes a decay function that will be applied to usage data for both Resource Type 1 and Resource Type 2, and the allocations of Resource Type 1 and Resource Type 2 to each user entity are represented by ALLOCATED_SHARES data. While the example of FIG. 4 has the advantage of simpler initialization compared to the example of FIG. 3, the used shares for each type of managed resource are still tracked separately because generally a user or group will not consume the same amount of each resource type over a period of time.

Approaches that combine aspects of the two examples of FIGS. 3 and 4 are also within the scope of the present invention. That is, data associated with managed resources in another embodiment of determining scheduling priorities of jobs may include both common parameters associated with the management of multiple resource types and individual parameters associated with a single resource type.

The fair share scheduling technique of an aspect of the present invention defines resource usage shares based on the total amount of managed resources available in the processing environment, instead of the total amount of resources consumed by the users. Additionally, job scheduling priority is assigned based on the number of shares of each resource type allocated to a user entity, as well as the shares of each resource type used by that user entity. Further details regarding a fair share scheduling technique in accordance with an aspect of the present invention are described with reference to the figures.

Figure 5:
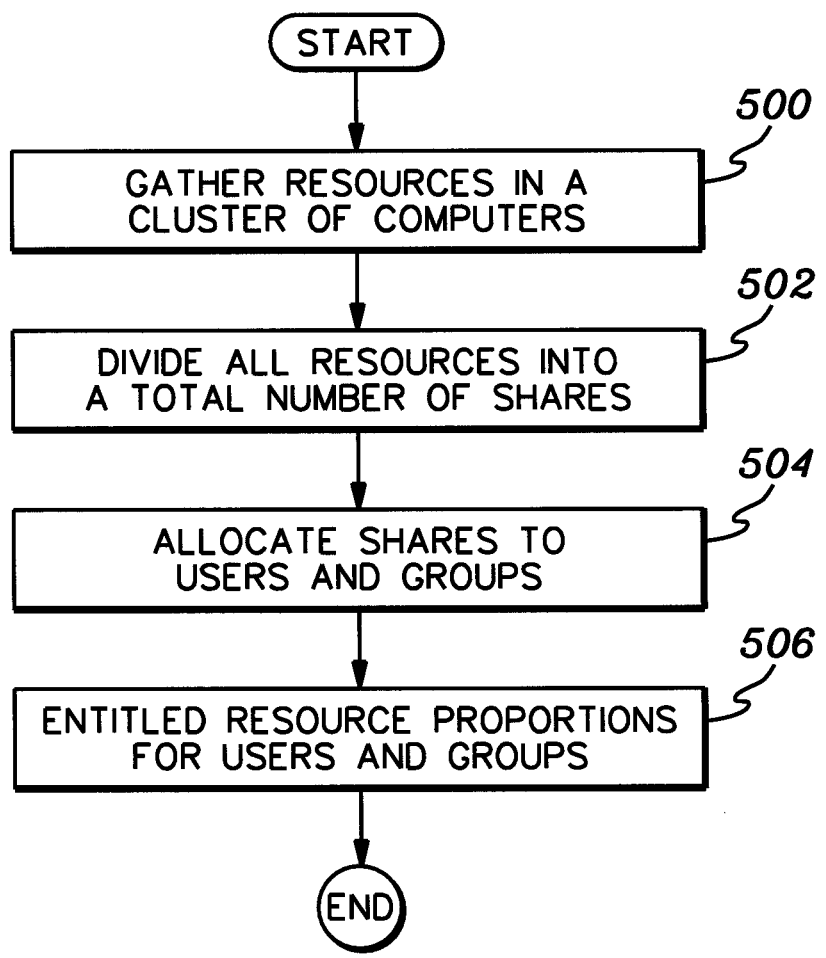
FIG. 5 depicts one embodiment of the logic used to allocate shares of managed resource types to user entities, in accordance with an aspect of the present invention.

Referring initially to FIG. 5, one embodiment of the logic associated with allocating shares of managed resource types to user entities is described. This logic is executed, in one example, by the job scheduler executing in one or more of the processing units of the processing environment. Further, this logic is executed for each type of resource to be shared by the users and groups of users of the environment. Initially, a determination is made as to an amount of each managed resource type in the processing environment to be shared, STEP 500 (FIG. 5). In one embodiment, it is the total amount of each resource type that is determined. The total amount of a resource type is all of the available resource of that type in the processing environment from the past to the present time with a decay function applied, such that a quantity of a resource type at a past time counts less in the total amount of a resource type as the past time becomes farther away from the present time. For example, to determine the total amount of CPU resource, the following formula is used:

$$\begin{aligned}\text{Total Amount of} \\ \text{CPU Resource}\end{aligned} = (\text{total number of processors}) * \int_0^\infty \exp(-k*t)$$

$$= (\text{total number of processors})/k,$$

where k is a decay constant that determines the speed of the decaying process and is an input to the function; and t is the amount of elapsed time.

As one particular example of determining the amount of resource, if central processor unit (CPU) resources are to be shared, then the number of processors available in the processing environment is determined. This determination may be made by, for instance, analyzing statistical information provided by the processing units. For example, each processing unit informs the manager (or managers) executing the job scheduler of the number of central processors available on that processing unit. The job scheduler accumulates this information and applies a decay function to determine the amount of CPU resources in the cluster.

For each managed resource type, the total amount of resource obtained is then divided into a total number of desired shares, STEP 502. The total number of desired shares is chosen by an administrator, in one example. Typically, if there is a large number of users in the environment, then a large number of total shares is desired. The larger the number of total shares, the smaller the quantity of resource per share, and the more sensitive the number of used shares is to the resource usage.

Shares are then allocated to one or more user entities of the processing environment, STEP 504. This allocation may also be specified by an administrator and provided as an input to the scheduler program, or the program can include a heuristic formula to define the allocations to users and groups of users. One or more factors may be used to determine the allocations, including, but not limited to, budget, importance, administrator's choice, etc.

Subsequent to allocating the shares of the managed resource types to the desired users and groups of users, entitled resource proportions of each managed resource type for those user entities are determined, STEP 506. For each resource type, this proportion is determined by dividing the number of shares of the resource type allocated to a user entity by the number of total shares of that resource type of the environment.

Figure 6:
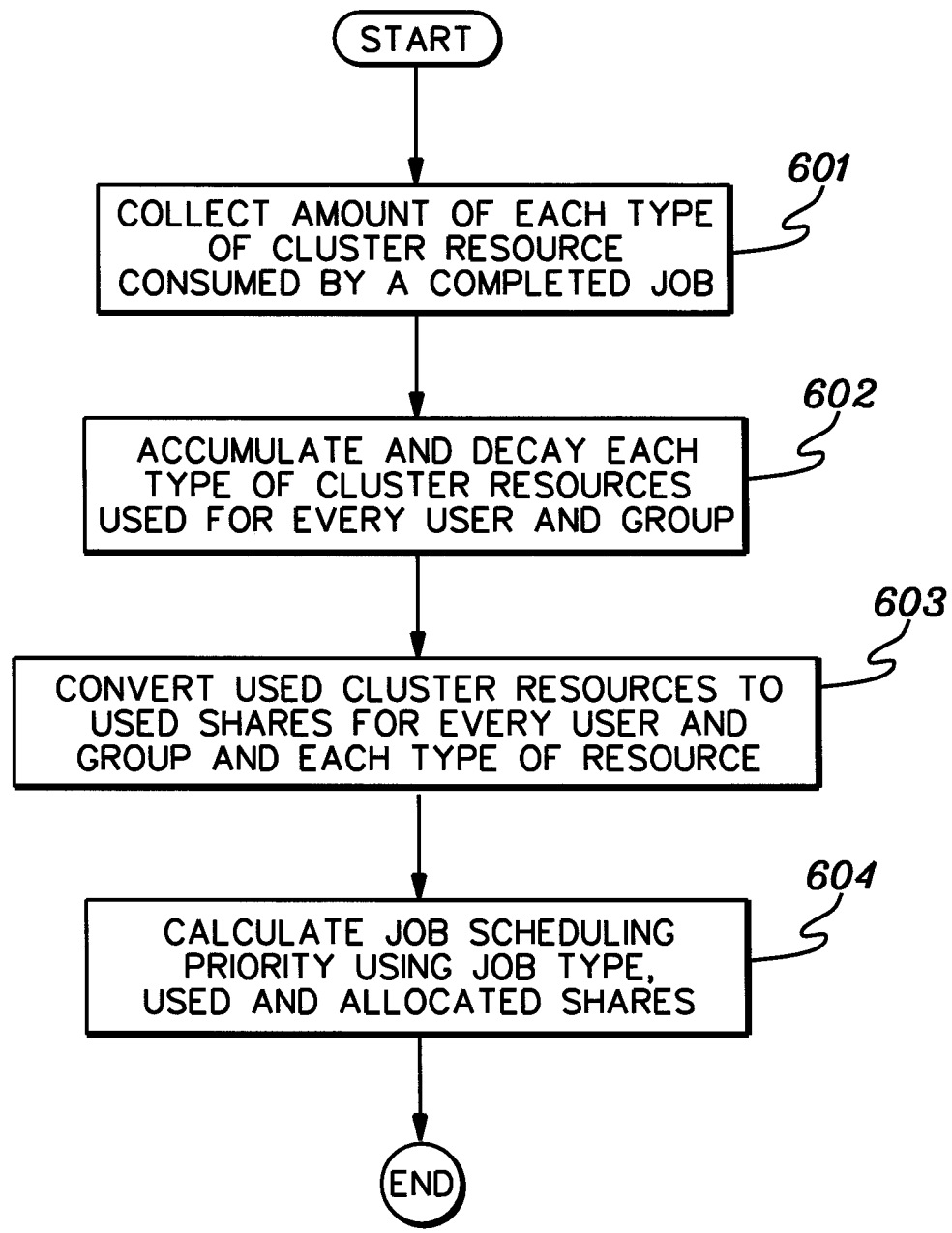
FIG. 6 depicts several aspects of a process for determining job scheduling priority for fair share scheduling of multiple resource types in a clustered processing environment, in accordance with the present invention.

FIG. 6 illustrates several aspects of determining job scheduling priority for fair share scheduling of multiple resource types in a clustered processing environment in accordance with the present invention. In general, the resource usage for each type of managed resource is collected from the machines in the cluster and accumulated at a central point for each user and group. In STEP 601, the amount of each type of managed cluster resource consumed by a completed job is collected. The amount of each type of managed resource used by each user entity is accumulated and subjected to a decay function in STEP 602. The accumulated and decayed measures of used resources from STEP 602 are converted to used shares of each resource type for each user entity in STEP 603 according to the total amounts of the resource types that are available and the numbers of total shares into which the total amounts available are divided. In STEP 604, the information on allocated and used shares for each managed resource type and each user or group together with job type information are then utilized to calculate job scheduling priorities for subsequently submitted jobs to facilitate workload management with fair share scheduling. Job scheduling priorities are calculated according to an expression that may include a user entity's remaining shares of at least one of the managed resource types and a job-type attribute as factors, and this expression, an example of which is described below, defines the characteristics of the fair share scheduling system. The influence of job types in the priority expression facilitates managing different types of resources separately. Also, the use of a job-type attribute in a job-scheduling-priority expression provides the customer with flexibility to tailor the operation of fair share scheduling to satisfy the customer's requirements. For example, the job-type attribute may be used so that one type of resource has a greater influence than another type of resource in the determination of a scheduling priority for a subsequently submitted job.

In another embodiment, the steps of collecting the amount of each resource type consumed by the jobs of each user entity, accumulating and applying a decay function to the amount of each managed resource used by each user entity, and converting the accumulated and decayed measures of used resource types to used shares may be executed periodically. In this embodiment, the amounts of resource types consumed are collected for the jobs of each user entity since the last periodic collection of resource usage information.

One embodiment of determining scheduling priorities, in accordance with the present invention, is employed in fair share scheduling for an exemplary mixed cluster comprising a Blue Gene® system and a number of other, non-Blue-Gene machines. In this embodiment, the managed resource types are the CPU resources of the other machines and the Blue Gene® system's resources. Jobs to be run on the Blue Gene® system mainly use resources of the Blue Gene® system, and a job-type attribute of these jobs indicates their job types to be BlueGene. Jobs to be run on the other, non-Blue-Gene machines do not use any Blue Gene® resources; a job-type attribute of these jobs indicates their job types to be non-Blue-Gene jobs.

A Blue Gene® system includes, for instance, compute nodes, input/output (I/O) nodes, switches, and wires. These components and resources may be utilized to execute a Blue Gene® job. A combination resource type of Blue Gene® resources may be defined in which the combination resource type includes some combination or all of these Blue Gene® components with a weighting factor assigned to each. One example of a measure of the amount of Blue Gene® resources used by a job is the product of the number of compute nodes used and the time periods spanned. Because the Blue Gene®/L System only allows one task of a parallel job to be run at a time on a compute node, the number of compute nodes used by a Blue Gene® parallel job is a relevant measure of the amount of Blue Gene® resource type used by a job run on a Blue Gene®/L System. With two types of resources defined for fair share scheduling of jobs submitted to the mixed cluster in this example, both types of resources consumed by a job will be collected and charged to the user and group associated with the job when the job is completed. This usage information may be used to calculate job priorities for subsequently submitted jobs.

The following equations are two examples of job scheduling priority expressions in accordance with an aspect of the present invention.

$$\text{JobPriority} = \text{JobIsBlueGene} * \text{UserHasBlueGeneShares} * 1000 + \text{JobIsNotBlueGene} * \text{UserHasCpuShares} * 100 \quad \text{Equation 1}$$

$$\text{JobPriority} = \text{JobIsBlueGene} * \text{UserRemainingBlueGeneShares} * 100 + \text{UserRemainingCpuShares} * 10$$

where $$\text{UserRemainingBlueGeneShares} = (\text{UserAllocatedBlueGeneShares} - \text{UserUsedBlueGeneShares})$$

$$\text{UserRemainingCpuShares} = (\text{UserAllocatedCpuShares} - \text{UserUsedCpuShares}) \quad \text{Equation 2}$$

When a job is of type BlueGene, variable JobIsBlueGene has a value of 1 and variable JobIsNotBlueGene has a value of 0; otherwise, the variable JobIsBlueGene has a value of 0 and the variable JobIsNotBlueGene has a value of 1. Variable UserRemainingBlueGeneShares is the difference between the allocated shares of the Blue Gene® resource type and the used shares of the Blue Gene® resource type for a user. If the value of the variable UserRemainingBlueGeneShares is positive, the variable UserHasBlueGeneShares is equal to 1, and, otherwise, the variable UserHasBlueGeneShares is equal to 0. The variable UserRemainingCpuShares is the difference between the allocated CPU shares of a non-Blue-Gene resource type and the used CPU shares for a user. If the value of the variable UserRemainingCpuShares is positive, the variable UserHasCpuShares is equal to 1; otherwise, the variable UserHasCpuShares is equal to 0. In Equation 1, if a job is of type BlueGene and if the user associated with the job has not used all of the shares of the Blue Gene® resource type allocated to that user, a Blue Gene® job submitted by the user will be given a job scheduling priority of 1000. If a submitted job is not of type BlueGene and if the user associated with the submitted job has not used all of the CPU shares of a non-Blue-Gene resource type allocated to the user, the job will be given a job scheduling priority of 100. However, the job scheduling priority of the submitted job calculated using Equation 1 is equal to 0 if a user has used all of the allocated shares of the type of resource needed to execute the job. As illustrated by this example, two types of resources may be managed independently in a mixed clustered environment.

In Equation 2, the job scheduling priority of every job submitted by a user is affected by the number of remaining shares of CPU resources of a non-Blue-Gene resource type that a user has. However, the scheduling priority of a Blue Gene® job is also affected by the user's remaining shares of the Blue Gene® resource type. The association of a job-type attribute with each job and the flexibility of an administrator-supplied job scheduling priority expression facilitates customers tailoring the characteristics of fair share scheduling for multiple types of resources in a mixed clustered environment to suite their particular needs.

Figure 7:
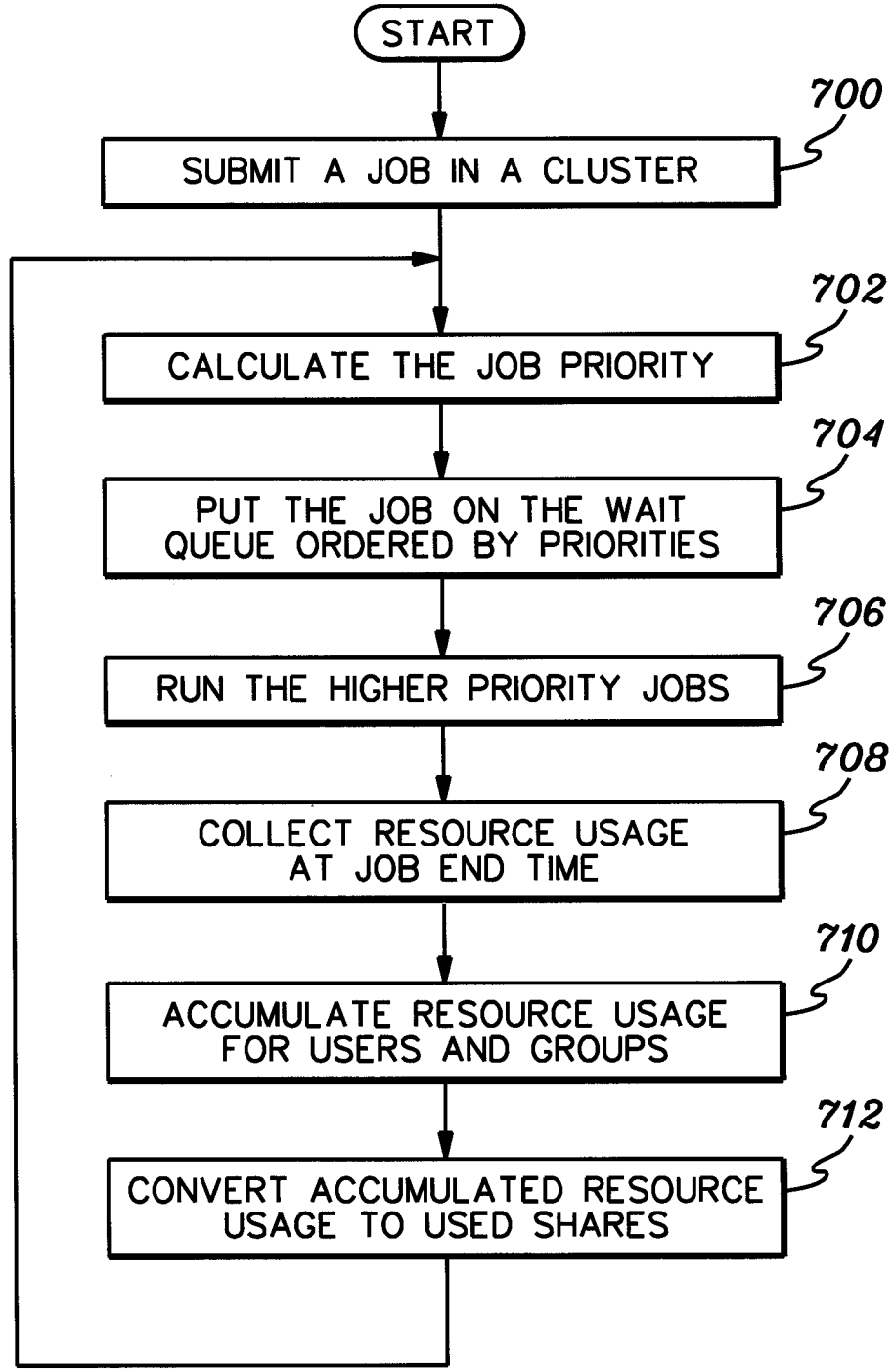
FIG. 7 depicts one embodiment of a process for fair share scheduling of jobs in a clustered processing environment that utilizes a technique for determining job scheduling priority, in accordance with an aspect of the present invention.

Subsequent to allocating the shares of the managed resource types to the user entities, a user entity may run jobs. The scheduling priorities of a user entity's jobs are determined based on the user entity's remaining shares of the managed resource types in the cluster, and the user entity's remaining shares are calculated from the user entity's allocated and used shares. That is, the priority of a job to be scheduled is based on the number of shares of the managed resource types allocated to the user entity requesting the scheduling of the job and the number of the user entity's shares that have been used. Generally, having remaining shares of the managed resource types affords a user's submitted jobs higher job scheduling priority. For the example of the job priority expression of Equation 2, the greater the number of shares remaining, the higher the job scheduling priority. One embodiment of a process for fair share scheduling of jobs in a clustered processing environment that utilizes a technique for determining job scheduling priority, in accordance with one aspect of the present invention, is described with reference to FIG. 7. In one exemplary system, the job scheduler of a processor in FIG. 1 performs the job scheduling process illustrated in FIG. 7.

Initially, a user submits a job to run in the processing environment, STEP 700, and the scheduling priority of the job is calculated by, for instance, the job scheduler in STEP 702. There are many ways to determine a job's scheduling priority and many variables for each resource type that may be used in the determination. Examples of these variables include:

(a) UserAllocatedShares—The total number of shares of a resource type allocated to a user by an administrator.
(b) UserUsedShares—The number of shares of a resource type used by the user, which is calculated by the job scheduler.
(c) UserRemainingShares—The difference between the values of the UserAllocatedShares and UserUsedShares variables.
(d) UserHasShares—A derived value that indicates whether the user has remaining shares of a resource type (e.g., a 0 indicates no remaining shares; a 1 indicates at least 1 remaining share).
(e) UserSharesExceeded—A value that indicates whether usage of a resource type by the user has exceeded its number of allocated shares of a resource type (e.g., a 0 indicates that usage has not exceeded the user's number of allocated shares; a 1 indicates it has).
(f) GroupAllocatedShares—The total number of shares of a resource type allocated to a group of users by an administrator.
(g) GroupUsedShares—The number of shares of a resource type used by the group, which is calculated by the job scheduler.

(h) GroupRemainingShares—The difference between the values of the GroupAllocatedShares and GroupUsedShares variables.

(i) GroupHasShares—A derived value that indicates whether the group has remaining shares of a resource type (e.g., a 0 indicates no remaining shares; a 1 indicates at least 1 remaining share).

(j) GroupSharesExceeded—A value that indicates whether usage of a resource type by the group has exceeded its number of allocated shares of a resource type (e.g., a 0 indicates usage has not exceeded the group's number of allocated shares; a 1 indicates it has).

Several other variables that may be used in determining job scheduling priority are included in the examples of Equation 1 and Equation 2 presented above. One or more of the above variables may be used in a job scheduling priority expression to calculate job scheduling priorities for jobs to be run in a mixed clustered processing environment. An administrator may specify one or more job priority expressions used to calculate job scheduling priorities. Examples of these expressions include Equation 1 and Equation 2 above. However, as will be appreciated by those of ordinary skill in the art, there are many other expressions that are possible.

Returning to FIG. 7, subsequent to determining the scheduling priority of the job, the job is placed on a wait queue ordered by job scheduling priorities, STEP 704. Then, jobs in the wait queue are run with the higher priority jobs being run first, STEP 706.

As a job ends, resource usage for managed resource types is collected for that job by the job scheduler in STEP 708. In particular, in one example, a job belongs to a user and a group of users, and resources used by that job are collected and accumulated for the user, as well as for the group, STEP 710. This usage is collected by the scheduler accessing appropriate information pertaining to the use of each resource type at job termination, as one example. A further example of the collection and accumulation of resource usage is described in a co-pending application, entitled "Fault Tolerant Facility For The Aggregation Of Data From Multiple Processing Units," Brelsford et al., U.S. Ser. No. 11/412,757, which is hereby incorporated herein by reference in its entirety.

The accumulated resource usage is then converted to used shares of a resource type, STEP 712. For instance, the value of the UserUsedShares variable of a resource type is calculated by dividing the accumulated resource usage of a resource type for the user by a quantity of that resource type per share (that is, Quantity Per Share=Total Resource Amount/Total Number of Shares). In one example, the total amount of a resource type (i.e., Total Resource Amount) is subject to the same decay function as the accumulation of used resources, if the resource type has a time-sensitive characteristic, i.e., if the resource type disappears with time, like an hour of CPU. Similarly, the value of the GroupUsedShares variable of a resource type is determined by dividing the accumulated resource type usage for the group by the quantity of that resource type per share.

Subsequent to converting the accumulated resource usage to used shares for each type of the resources, processing continues with calculating the job priority for the next job, STEP 702.

Figure 8:
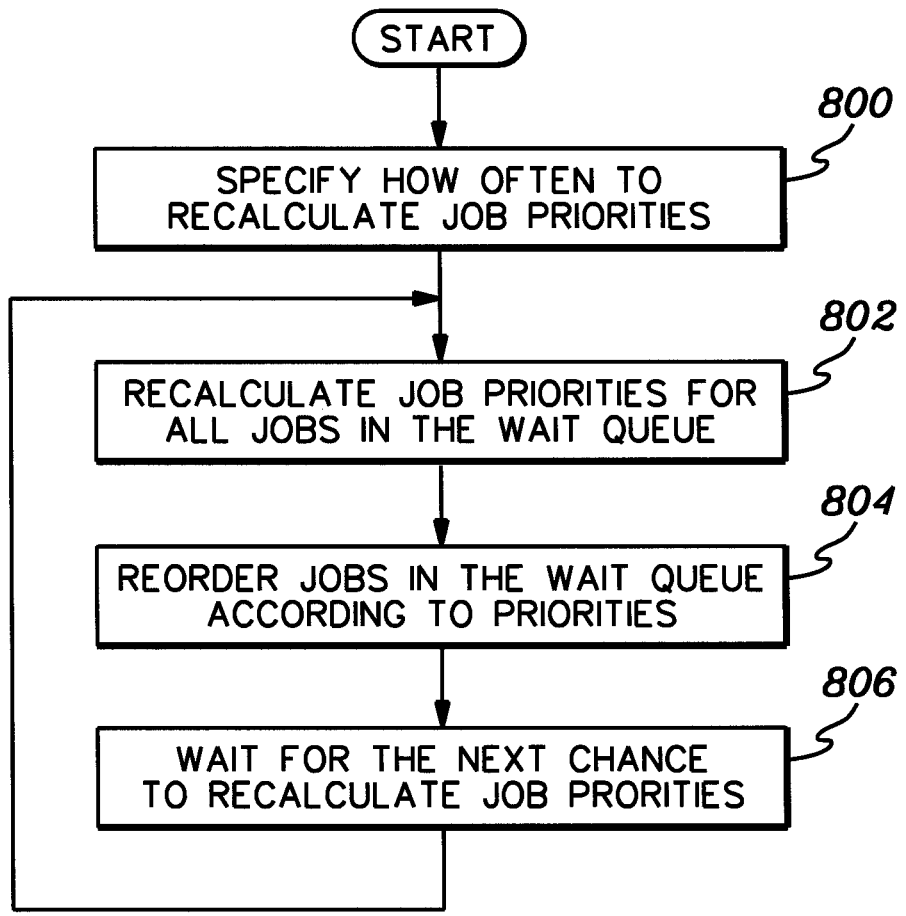
FIG. 8 depicts one embodiment of the logic associated with updating the scheduling of jobs in a job wait queue, in accordance with an aspect of the present invention.

At periodic intervals, the priorities of the jobs in the job wait queue are recalculated by the job scheduler, in one example. One embodiment of the logic associated with updating the scheduling of jobs in a job wait queue is described with reference to FIG. 8. Initially, a determination is made as to how often to recalculate the job priorities, STEP 800. As one example, a time interval of every 5 minutes is selected by, for instance, an administrator. Other intervals may also be chosen.

At the end of the specified time interval, job priorities for all jobs in the wait queue (or a portion thereof, if preferred) are recalculated using any desired expression comprising variables, as described above, STEP 802. The jobs in the wait queue are then reordered according to the new job scheduling priorities, STEP 804. Thereafter, the logic waits for the next chance to recalculate the job scheduling priorities, STEP 806. When, for instance, the specified time interval expires, processing then continues with recalculating job priorities, STEP 802.

Figure 9:
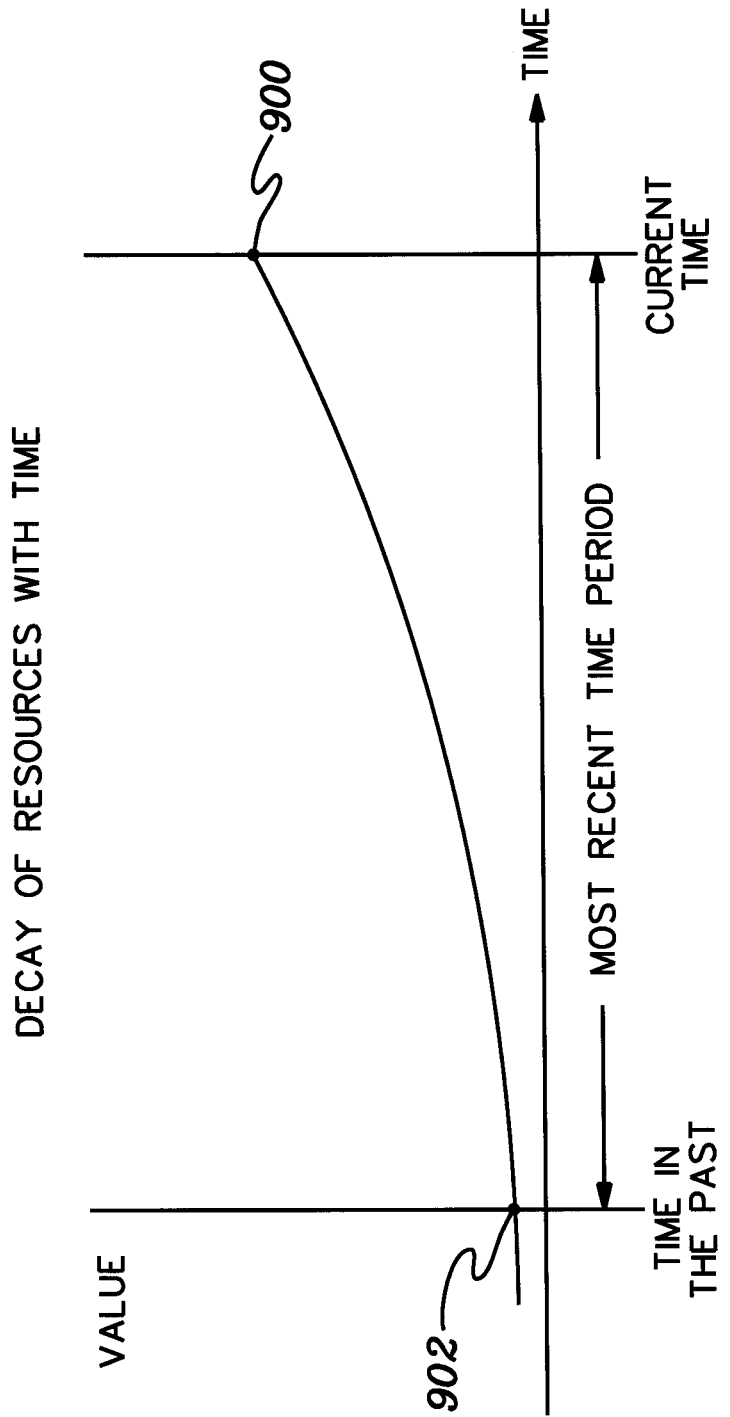
FIG. 9 depicts a decaying value of an amount of a resource type with time, in accordance with an aspect of the present invention.

As previously described, when a job ends, resource usage is collected and accumulated, and then the accumulated usage is converted to used shares. This accumulated usage of managed resource types is historic in nature and influences job scheduling decisions. The collection and accumulation of usage data for managed resource types can be performed in a number of ways. However, in accordance with one aspect of the present invention, the recent resource usage is counted more heavily than the usage at earlier times. That is, the same amount of a resource has less value as time goes by. For example, as shown in FIG. 9, at the current time, an amount of resource usage has its greatest value (900), while the more distant the time in the past of the same amount of usage, the less the value (902) of the usage due to the decay function applied to this data.

In one example, only one accumulative data value is recorded for the historic usage of a managed resource type by each user or group. Further, there is no need to discard any old usage data, as the influence of resource usage data decreases naturally with time in the accumulative data. The accumulative data for a resource type includes contribution from all past usage data (or a selected amount of usage data) for that resource type, and a finite interval for inclusion of resource usage data is not needed. A decay mechanism is applied substantially continuously during the usage data accumulation process, such that the accumulative data reflects the overall time-decayed resource usage.

In one embodiment, the decay function employed is an exponential function $\exp(-k*t)$, in which k is a decay constant that determines the speed of the decaying process and is an input to the function, and t is the amount of elapsed time since the resource type usage was first reported or collected.

When a resource usage, R1, is collected for a resource type, its contribution to the accumulative historic resource usage decreases according to the decay function. When new resource usage data, R2, is collected for that resource type, new data R2 is added directly to the decayed value of R1 at the time, and the accumulative value is decayed together as time goes by. This process can be repeated as new resource usages are collected. Thus, it is not necessary to keep track of the each resource usage data sample collected. It is sufficient to keep track of the accumulative resource usage data for a resource type. This property of such an exponential function is shown by the following equations:

$$R1*\exp(-k*(t-t1))+$$

$$R2*\exp(-k*(t-t2))+$$

$$R3*\exp(-k*(t-t3))=S4 \text{ with}$$

$$S1=R1 \text{ (at time t1)}$$

$S2=S1*\exp(-k*(t2-t1))+R2$ (at time t2)

$S3=S2*\exp(-k*(t3-t2))+R3$ (at time t3)

$S4=S3*\exp(-k*(t-t3))$ (at time t).

Figure 10:
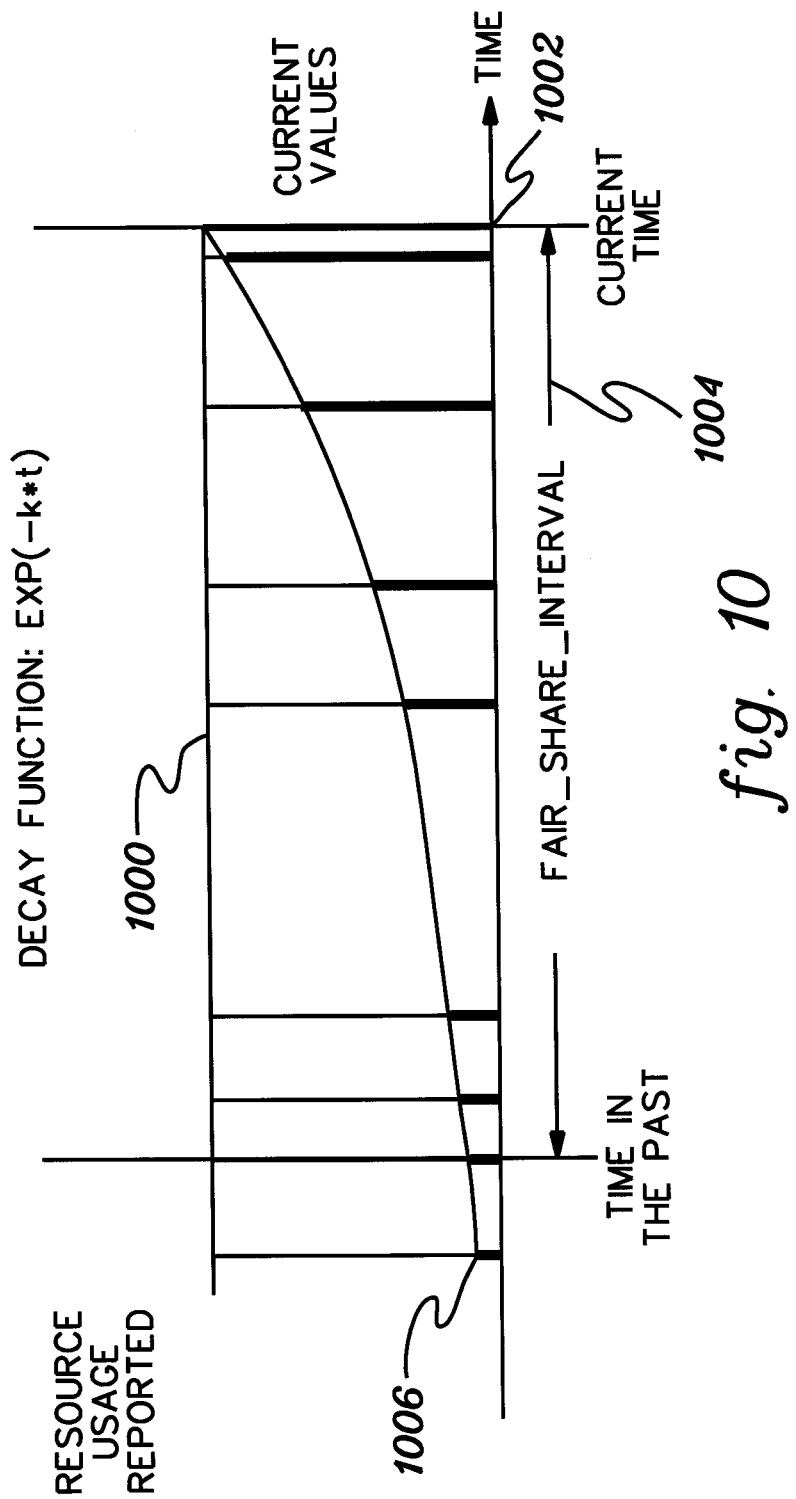
FIG. 10 is a further depiction of the decaying values of amounts of a resource type over time, in accordance with an aspect of the present invention.

One pictorial depiction of this decay function is shown in FIG. 10. As shown, the vertical lines connecting with a horizontal line 1000 represent the initial values of the reported usages of a resource type at different times in the past, which are the same throughout time, in this example. The segments of the vertical lines under the exponential curve represent the current values of the initially reported resource usage values. At current time 1002, the value of the initially reported usage of a resource type is at its peak. A fair share interval 1004 is selected that determines the decay constant. In one example, the fair share interval equals 5% of life, which is the time needed to decay an amount of reported resource usage to 5% of its initial value. Resource usage reported at time 1006 has a value at the current time, which is less than 5% of the initially reported value.

Figure 11:
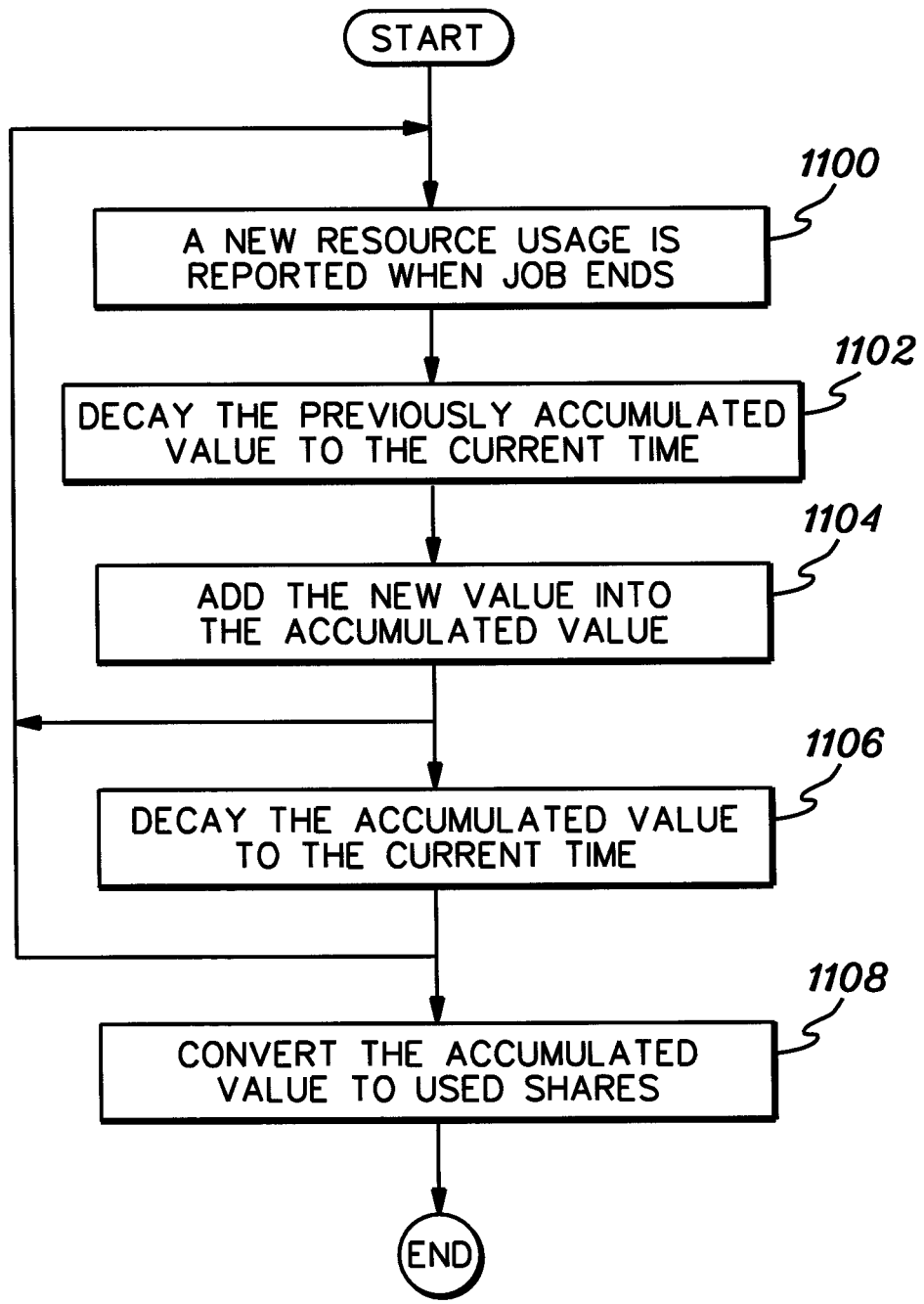
FIG. 11 depicts one embodiment of the logic associated with accumulating usage of a resource type for fair share scheduling, in accordance with an aspect of the present invention.

Using a decay function to decay the accumulated usage of a resource type is described with reference to FIG. 11. In one embodiment, a new usage of a resource type is reported to the job scheduler periodically or in response to, for instance, termination of a job, STEP 1100. The job scheduler then decays the previously accumulated value of resource usage to the current time in STEP 1102, and the new reported usage value is added to the accumulated value in STEP 1104. For instance, if 5 minutes ago (t), the collected usage value was 100 CPU minutes, then that value is decayed by multiplying 100×exp(−k*5) to obtain a result for the accumulated value of resource usage that is decayed to the present time. Then, the new resource usage value at the current time, e.g., 110 CPU minutes, is added to this result to produce the new accumulated value of usage for that resource type. Processing then continues with STEP 1100.

Further, to calculate the number of used shares, the new accumulated value is decayed to the current time, STEP 1106, and the decayed accumulated value from STEP 1106 is converted to a number of used shares, STEP 1108. This processing is performed by, for instance, the job scheduler.

Described in detail above is a fair share scheduling capability that enables the division of resources to be based on the total available resources of the environment, rather than the amount of resources consumed by others. This manner of dividing resources and defining shares is more stable and fair. It is more stable because it is independent of the current workload. It is more fair because the number of shares the user consumes depends on the amount of each resource type that the user has and the amount of each resource type the user has used, instead of the amounts of the managed resources that other users happen to use.

The amounts of the managed resource types used by a user entity are recorded and used to determine the numbers of used shares of the managed resource types. In one example, a decay mechanism is applied against the historic usage of a managed resource type to place more weight on recent usage. Advantageously, the amount of data that is tracked is greatly reduced, since only one piece of data, which includes, for instance, the resource usages collected in the past and the timestamp when the data was updated, is tracked per resource type for each user entity. Further, there is no need to limit historic usage of a resource type to be within a finite time interval. The most significant contribution comes naturally from the most recent historic resource usages. This is a simple and easy technique to record usage information that increases performance and reduces software development efforts.

The recorded historic usage of a managed resource type, with the appropriate decay applied, is divided by the per-share amount for the resource type to obtain the number of used shares of a resource type for the user or group or both. The per-share amount of a resource type is subject to the same decay mechanism. The total amount of a resource type from the distant past to the current time is infinite without decay. With the decay function applied to the amounts of a resource type in each instant of time and integration from the distant past to the current time, the total amount of a resource type is a finite quantity. The per-share amount of a resource type is obtained by dividing this finite quantity by the total number of shares. The numbers of used and allocated shares of the managed resource types are used in determining the job scheduling priority in an attempt to enable a user entity to use the proportion of resources it is entitled to use. Since the numbers of used and allocated shares change continuously, job scheduling priorities are recalculated from time to time.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of one or more aspects of the present invention. The article of manufacture can be included as a part of a computer system or sold separately.

Figure 12:
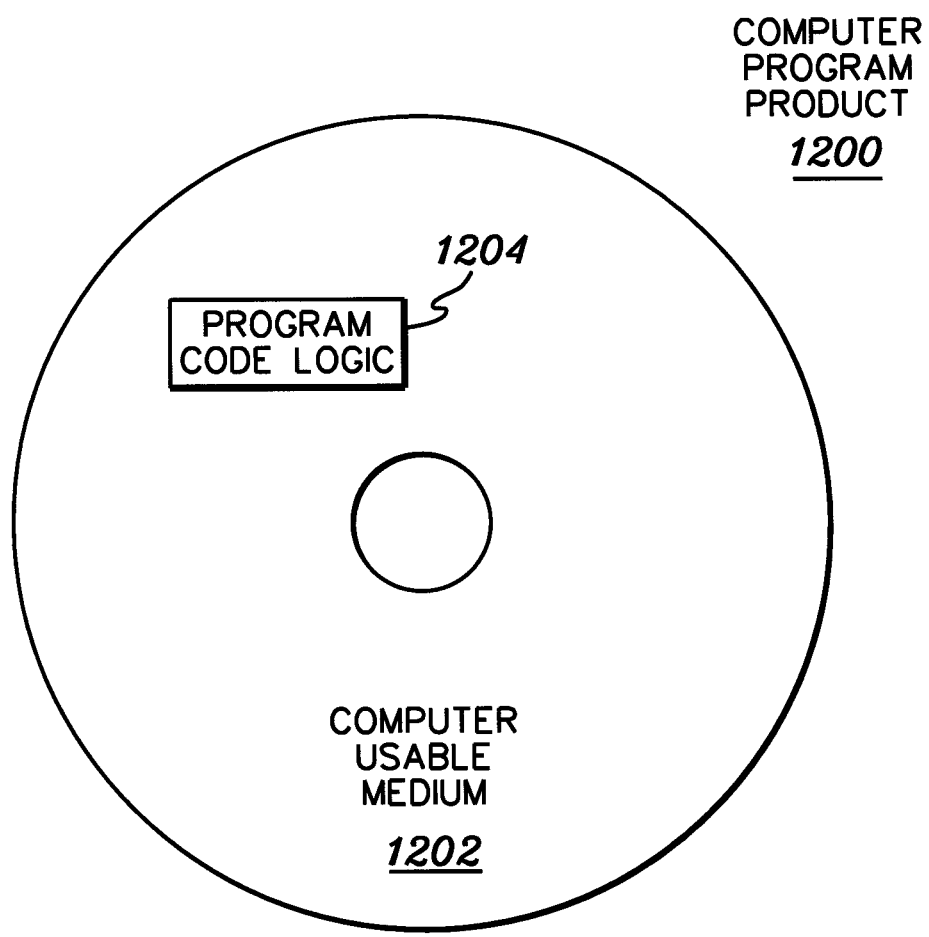
FIG. 12 depicts one example of a computer program product incorporating one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and digital versatile disc or digital video disc (DVD).

A sequence of program instructions or a logical assembly of one or more interrelated modules defined by one or more computer readable program code means or logic direct the performance of one or more aspects of the present invention.

One or more aspects of the fair share scheduling capability described herein are or can be included in various products, including, but not limited to, workload management products, such as Tivoli Workload Scheduler Load-Leveler® offered by International Business Machines Corporation. ("LoadLeveler" is a registered trademark of International Business Machines Corporation, Armonk, N.Y.). Other products, including, but not limited to, other workload management products, can include one or more aspects of the present invention.

Advantageously, one or more aspects of the present invention allow the total amount of each type of the resources available in the processing environment to be divided into a finite number of shares, which is the total number of shares of the resource type in the processing environment. Administrators specify, for each type of the managed resources, the total number of shares that the total amount of a resource is divided into and the number of shares that each user or group of users is allocated. The ratio of the allocated shares versus the total number of shares specifies the proportion of a resource type allocated to a user entity. The proportion defined is independent of the amount of the resource type consumed by other user entities, and the job scheduling priority assigned to a user entity's job is independent of use of the managed resource types by other user entities. This way of assigning resource proportion entitlement to the managed resource types has the advantages of being able to adjust the sensitivity of the number of used shares to resource usage and making it easy and flexible to allocate shares to users or groups. The quantity of a resource type per share is stable given a cluster having fixed amounts of the managed resource types. Further, advantageously, administrators are allowed to specify how the used and allocated shares affect the job scheduling priorities to achieve their goal of fairly sharing cluster resources among users and groups of users. This gives administrators the flexibility to adjust how much influence fair share scheduling is to have on job scheduling in a cluster of machines. With one or more aspects of the present invention, real resources are shared effectively over a period of time, as resource usage long ago contributes little to the historic resource usage data due to decay.

Although one or more examples have been provided herein, many variations of these examples can be made without departing from the spirit of the present invention. For instance, processing environments other than the examples provided herein may include one or more aspects of the present invention. For example, the environment may not be a clustered environment; it may include more or less processing units than described herein. Yet further, the environment may include an operating system other than Linux or AIX®. Still further, networks or connections other than those described herein may be used. Still further, one or more of the processing units may be different from a pSeries® server or a Blue Gene® system. Many other variations exist.

For instance, the processing environment may comprise a data processing system for storing program code that includes at least one processor coupled directly or indirectly to memory elements through a system bus. As another example, the processing environment may comprise a data processing system for executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method of determining scheduling priorities of jobs, each job comprising one or more programs, of different types to facilitate workload management of job execution in a clustered processing environment by enabling management of different types of computing resources separately in the clustered processing environment comprising different types of computing resources, the method comprising:
    allocating, by one or more processors of the clustered processing environment, shares of multiple managed resource types of a plurality of managed resource types to at least one user entity of a clustered processing environment, wherein the allocating comprises allocating one or more shares of each of the multiple managed resource types to the at least one user entity, wherein the multiple managed resource types are different types of computing resources of one or more computing machines in the clustered processing environment, and wherein resources of the clustered processing environment are shared to perform system tasks; and
    assigning, by a job scheduler executing on the one or more processors of the clustered processing environment and responsible for scheduling jobs using the multiple managed resource types, a job priority for a subsequent job submitted by a user entity of the at least one user entity, wherein the job priority is determined based on a type attribute of the subsequent job, the type attribute identifying a resource type of the only managed resources types of the different types of computing resources capable of completing the subsequent job and wherein the job priority of the subsequent job is also determined based on a number of the user entity's remaining shares of each individual managed resource type of at least two managed resource types allocated to the user entity, wherein a first managed resource type of the two managed resource types is the resource type identified by the type attribute, wherein the first managed resource type has a greater influence in determining the job priority of the subsequent job than other managed resource types excluding the first resource type comprising the at least two managed resource types; and
    executing, by at least one resource of the resources of the clustered processing environment identified by the type attribute, the subsequent job, at a given time, the given time determined by the one or more processors based on the assigned job priority.

2. The method of claim 1, further comprising accepting initialization parameters for the plurality of managed resource types in the clustered processing environment.

3. The method of claim 2, wherein the initialization parameters comprise at least one unique parameter for the each managed resource type.

4. The method of claim 2, wherein at least one of the initialization parameters is utilized in the allocating.

5. The method of claim 1, further comprising accepting an expression to be employed in the assigning, the expression being input by a user with administrative authority.

6. The method of claim 1, wherein the assigning utilizes an expression comprising a non-zero constant factor corresponding to one managed resource type of the plurality of managed resource types, responsive to the number of the user entity's remaining shares of the one managed resource type of the plurality of managed resource types being greater than zero.

7. The method of claim 1, wherein the assigning utilizes an expression comprising a proportional factor, the proportional factor being proportional to the number of the user entity's remaining shares of one managed resource type of the plurality of managed resource types.

8. The method of claim 1, further comprising accepting a designation of the plurality of managed resource types, the designation being provided by a user with administrative authority.

9. The method of claim 1, further comprising determining a number of remaining shares of the each individual managed resource type for the user entity, said determining using a time-decaying accumulation of used shares of the each individual managed resource type, wherein the number of the user entity's remaining shares of each individual managed resource type allocated to the user entity is independent of usage of the managed resource types by other user entities of the clustered processing environment.

10. The method of claim 9, further comprising accepting initialization parameters for the multiple managed resource types in the clustered processing environment, wherein at least one of the initialization parameters characterizes the time decaying accumulation of the used shares of at least one managed resource type of the each managed resource type.

11. A system for determining scheduling priorities of jobs, each job comprising one or more programs, of different types to facilitate workload management of job execution in a clustered processing environment by enabling management of different types of computing resources separately in the clustered processing environment comprising different types of computing resources, the system comprising:
   one or more memories;
   one or more processors in communication with the one or more memories; and
   program instructions executable by the one or more processors via the memory to perform a method, the method comprising:
      allocating, by the one or more processors, shares of multiple managed resource types of a plurality of managed resource types to at least one user entity of a clustered processing environment, wherein the allocating comprises allocating one or more shares of each of the multiple managed resource types to the at least one user entity, wherein the multiple managed resource types are different types of computing resources of one or more computing machines in the clustered processing environment, and wherein resources of the clustered processing environment are shared to perform system tasks; and
      assigning, by a job scheduler executing on the one or more processors, a job priority for a subsequent job submitted by a user entity of the at least one user entity, wherein the job priority is determined based on a type attribute of the subsequent job, the type attribute identifying a resource type of the only managed resources types of the different types of computing resources capable of completing the subsequent job and wherein the job priority of the subsequent job is also determined based on a number of the user entity's remaining shares of each individual managed resource type of at least two managed resource types allocated to the user entity, wherein a first managed resource type of the two managed resource types is the resource type identified by the type attribute, wherein the first managed resource type has a greater influence in determining the job priority of the subsequent job than other managed resource types excluding the first resource type comprising the at least two managed resource types; and
      executing, by at least one resource of the resources of the clustered processing environment identified by the type attribute, the subsequent job, at a given time, the given time determined by the one or more processors based on the assigned job priority.

12. The system of claim 11, wherein the job scheduler is further adapted to accept initialization parameters for the plurality of managed resource types in the clustered processing environment.

13. The system of claim 11, wherein the job scheduler is further adapted to accept an expression to be employed in the assigning, the expression being input by a user with administrative authority.

14. The system of claim 11, wherein the job scheduler is further adapted to accept a designation of the plurality of managed resource types, the designation being provided by a user with administrative authority.

15. The system of claim 11, wherein the job scheduler is further adapted to determine a number of remaining shares of the each individual managed resource type for the at least one user entity using a time-decaying accumulation of used shares of the each individual managed resource type, wherein the number of the user entity's remaining shares of each individual managed resource type allocated to the user entity is independent of usage of the managed resource types by other user entities of the clustered processing environment.

16. A computer program product for determining scheduling priorities of jobs, each job comprising one or more programs, of different types to facilitate workload management of job execution in a clustered processing environment by enabling management of different types of computing resources separately in the clustered processing environment comprising different types of computing resources, the computer program product comprising:
   a non-transitory computer readable storage medium readable by a processor and storing instructions for execution by the processor for performing a method comprising:
      allocating, by one or more processors of the clustered processing environment, shares of multiple managed resource types of a plurality of managed resource types to at least one user entity of a clustered processing environment, wherein the allocating comprises allocating one or more shares of each of the multiple managed resource types to the at least one user entity, wherein the multiple managed resource types are different types of computing resources of one or more computing machines in the clustered processing environment, and wherein resources of the clustered processing environment are shared to perform system tasks; and assigning, by a job scheduler executing on the one or more processors of the clustered processing environment and responsible for scheduling jobs using the multiple managed resource types, a job priority for a subsequent job submitted by a user entity of the at least one user entity, wherein the job priority is determined based on a type attribute of the subsequent job, the type attribute identifying a resource type of the only managed resources types of the different types of computing resources capable of completing the subsequent job and wherein the job priority of the subsequent job is also determined based on a number of the user entity's remaining shares of each individual managed resource type of at least two managed resource types allocated to the user entity, wherein a first managed resource type of the two managed resource types is the resource type identified by the type attribute, wherein the first managed resource type has a greater influence in determining the job priority of the subsequent job than other managed resource types excluding the first resource type comprising the at least two managed resource types; and executing, by at least one resource of the resources of the clustered processing environment identified by the type attribute, the subsequent job, at a given time, the given time determined by the one or more processors based on the assigned job priority.

17. The at least one program storage device of claim 16, wherein the method further comprises accepting initialization parameters for the plurality of managed resource types in the clustered processing environment.

18. The at least one program storage device of claim 16, wherein the method further comprises accepting an expression to be employed in the assigning, the expression being input by a user with administrative authority.

19. The at least one program storage device of claim 16, wherein the method further comprises accepting a designation of the plurality of managed resource types, the designation being provided by a user with administrative authority.

20. The at least one program storage device of claim 16, wherein the method further comprises determining a number of remaining shares of the each individual managed resource type for the at least one user entity using a time-decaying accumulation of used shares of the each individual managed resource type, wherein the number of the user entity's remaining shares of each individual managed resource type allocated to the user entity is independent of usage of the managed resource types by other user entities of the clustered processing environment.

21. The method of claim 1, wherein a greater the number of the user entity's remaining shares, a higher the job priority.

22. The method of claim 1, wherein the type attribute is used to determine which managed resource type is to have a greater effect than another managed resource type in assigning the job priority.

23. The method of claim 1, wherein the assigning of the job priority based on a number of the user entity's remaining shares of each individual managed resource type of at least two managed resource types comprises assigning weighted values to each individual managed resource type and utilizing the weighted values in determining the job priority of the subsequent job.

24. The method of claim 23, further comprising: multiplying the number of the user entity's remaining shares of each individual managed resource type by a respective weighted value for each individual managed resource type.

25. The method of claim 24, wherein the weighted value assigned to at least one individual managed resource type is greater than zero if the at least one resource is capable of completing the subsequent job.

* * * * *